April 14, 1970   J. R. SULLIVAN   3,506,902
RECHARGEABLE CELLS AND CONNECTION MEANS THEREFOR
Filed July 27, 1967

INVENTOR
JAMES R. SULLIVAN
BY
ATTORNEY

United States Patent Office 3,506,902
Patented Apr. 14, 1970

3,506,902
RECHARGEABLE CELLS AND CONNECTION MEANS THEREFOR
James R. Sullivan, Arlington Heights, Ill., assignor to P. R. Mallory & Co., Inc., Indianapolis, Ind., a corporation of Delaware
Filed July 27, 1967, Ser. No. 656,490
Int. Cl. H02j 7/32; H01m 45/04
U.S. Cl. 320—2    7 Claims

ABSTRACT OF THE DISCLOSURE

A separate, circumferential charging terminal is positioned on a rechargeable electrical cell. The terminal may be formed by cutting away a portion of the cell's insulating wrapper to expose an area of its conductive casing. A contact engaging the circumferential terminal is connected to a charging circuit of the cell.

---

Recent trends toward the use of battery power for small electrical appliances, tools and many other devices is due in large measure to the development of high-capacity rechargeable cells of a size comparable to that of the older zinc-carbon cells. The similar sizes and voltages of the rechargeable cells and the conventional cells render the two types in most cases freely interchangeable in a given electrical device. Interchangeability has, in fact, been an affirmative design goal, so that older devices might utilize newer cells.

Many of the newer battery-powered devices have been built with the rechargeable cells primarily in mind. Thus these devices may have a built-in, or otherwise closely associated, battery charger for the cells. However, since conventional cells may also be used in these devices, it is desirable to prevent the charger from operating should nonrechargeable cells be inserted in the device. It is further desirable to interdict the charger should a rechargeable cell be inadvertently inserted in a reversed position, in order to prevent damage to the cell from charging current of incorrect polarity.

Almost universally, small electrical cells are substantially cylindrical in shape. In many instances, the bases of the cylinder are circular; but other shapes are also common, such as obround, rectangular or polygonal. Such cells have a terminal at either end and a conductive casing which is electrically connected to one of the end terminals. The cylindrical surface of the casing is then overlaid with an insulating wrapper, generally of paper or plastic, which protects the cell against accidental short circuits and upon which identifying information is printed, such as the cell type and voltage, polarity of the terminals, manufacturer's name and so forth.

Briefly, the present invention achieves the object of allowing a charger to operate only on rechargeable cells by providing a separate circumferential charging terminal, which is electrically connected to one of its end terminals, on rechargeable cells only, so that a contact affixed to a holder and connected to a charging circuit engages the charging terminal, but is prevented from contacting a non-rechargeable cell by such cell's insulating wrapper. A second object, the prevention of reverse-polarity charging, is attained by placing the charging terminal asymmetrically on the cylindrical surface of the cell, so that the insulating wrapper will preclude charging when the cell is connected to a charging circuit with incorrect polarity. Another object resides in the fact that the provision of a separate charging terminal is simply achieved, and will add little, if anything, to the cost of the cell.

Further objects and advantages of the invention, as well as modifications obvious to those skilled in the art, will become apparent from the following description taken in conjunction with the acompanying drawing, in which.

Figure 1:
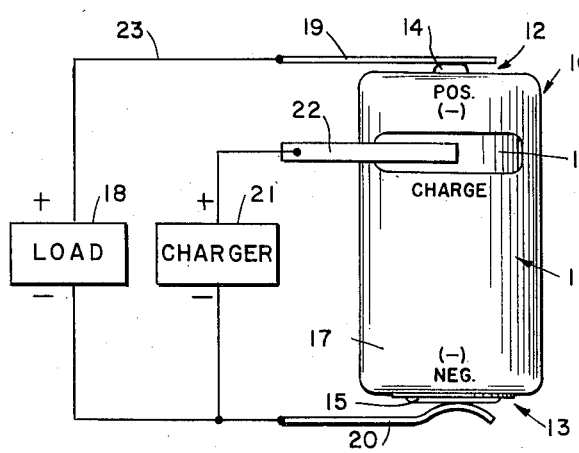
FIGURE 1 is a side elevation of an electrical cell and circuitry, shown schematically, according to the invention.

Referring more particularly to FIGURE 1 of the drawing, the reference numeral 10 indicates a substantially cylindrical rechargeable electrical cell having a cylindrical surface 11 and a pair of bases or ends 12 and 13, here shown to be circular. The bases 12 and 13 carry conventional end terminals 14 and 15 respectively. The cylindrical surface 11 carries a charging terminal 16 which is electrically connected to one of the end terminals 14 and 15. The portion of the surface 11 which is not occupied by the terminal 16 is protected by an insulating wrapper 17. In an electrical device, a load circuit 18 is connected between the end terminals 14 and 15 by means of a pair of contacts 19 and 20. A charging circuit 21 is then connected between the end terminal 15 and the charging terminal 16 by means of the contacts 20 and 22. Thus, it will be appreciated that the charging circuit 21 will be inoperative if a nonrechargeable cell, which does not have the terminal 16, is placed between the contacts 19 and 20. Such a cell will, however, supply power to the load circuit 18 in normal fashion. Furthermore, the terminal 16 is located asymmetrically on the surface 11; that is, it is closer to the base 12 than to the base 13. Therefore, an inadvertent reversal of the cell 10 between the contacts 19 and 20 will cause the charging contact 22 to engage the insulating wrapper 17 rather than the charging terminal 16, and the charging circuit 21 will not operate. Reversal of the cell 10 will not affect the load circuit 18. In many instances the load is not polarity-sensitive; but if a reversed polarity is deleterious to the load circuit 18, any of a number of conventional protection means, such as a diode (not shown) in the lead 23, may be employed.

Of course, the charging terminal 16 may take a number of forms, including, for instance, a metallic strip affixed to the wrapper 17 and connected to an end terminal by means of a wire. However, since small cells commonly have a conductive casing underlying the insulating wrapper and connected to one of the cells end terminals, the casing itself may be employed as a charging terminal. In the cell 10' of FIGURE 2, the positive end terminal 14 is formed integrally with the conductive casing 24, the negative end terminal 15 being separated therefrom by an insulating member 25.

The cell wrapper 17', which may conveniently be fabricated from paper, cardboard or plastic, insulates the cell 10' from accidental short circuit and also provides for the printing of identifying information. In conventional cells, the wrapper covers substantially all of the cylindrical surface 11. In a cell 10' according to the invention, however, a portion of the wrapper is removed to expose an area 26 of the conductive casing 24. The area 26, here shown as a band encircling the cell 10', then serves as a charging terminal 16' without any further modification of the cell. The annular shape of the terminal 16' facilitates the placement of the cell 10' by making rotational orientation of the cell immaterial to engagement of a charging contract, but any other convenient shape, such as a rectangular window, may be used. Again, the terminal 16' is positioned asymmetrically on the surface 11 so that reversal of the cell will not damage or destroy the cell by the application of incorrectly polarized charging current. If desired, the terminal 16' may be positioned on the surface 11 immediately adjacent one of the bases 12 or 13; this would allow the wrapper to be made in a single piece with no punching or cutting required, and thus may actually decrease the cost of the cell over that of conventional cells of similar type.

Figure 2:
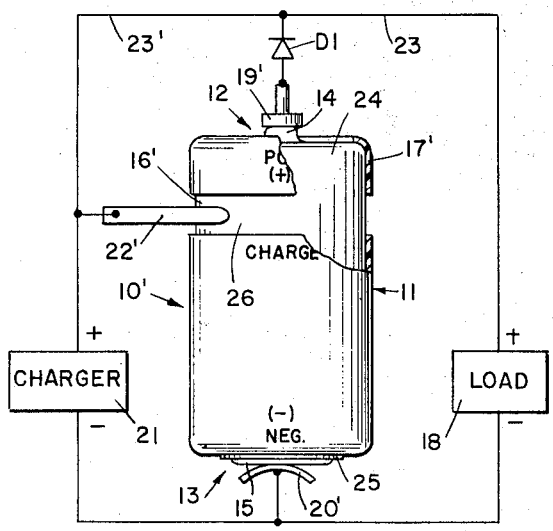
FIGURE 2 shows a side elevation, partially broken away, of an electrical cell and circuitry according to the invention.

The circuitry associated with the cell of FIGURE 2 has a diode D1 connected to the cell's positive contact 19' and an extension 23' of the lead 23 connected between the diode D1 and the charging terminal 22'. The polarity of the diode allows current to flow from the positive terminal 14 to the load 18, but does not allow current from the charger 21 to flow into the terminal 14. The diode is of course short-circuited by engagement of the contact 22' with the charging terminal 16', since the latter is electrically connected to the terminal 14. It is often desirable, however, to permit the charger 21 to operate the load 18 directly even when a nonrechargeable cell is placed in the circuit. The circuit shown in FIGURE 1 does not permit this effect, since the charger 21 is then completely disengaged by the insulating wrapper 17; but FIGURE 2 provides a direct connection between charger 21 and load 18 even when the charging terminal 22' is disengaged by placing a nonrechargeable cell into the circuit. The diode D1 additionally serves the purpose of protecting the load 18 against inadvertent reversal of the cell 10' between the contacts 19' and 20'.

Figure 3:
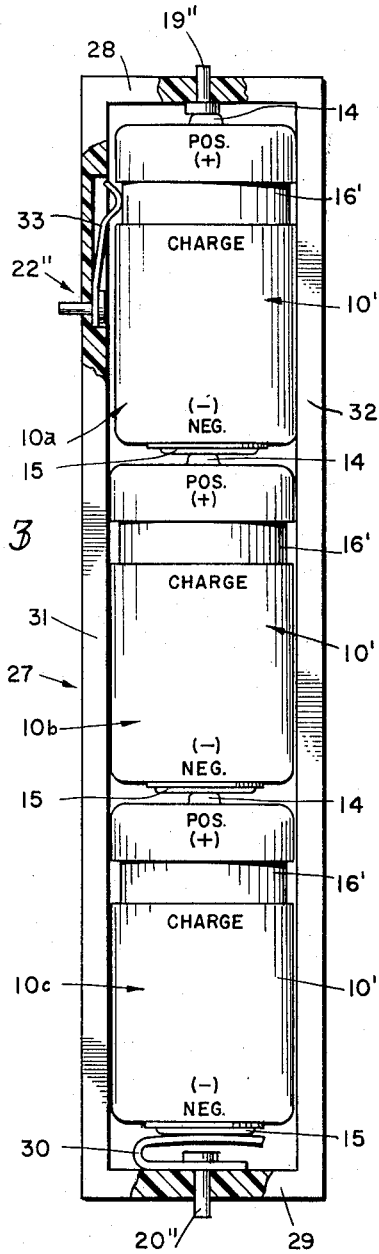
FIGURE 3 illustrates a plurality of rechargeable cells in a holder, according to the invention.

FIGURE 3 depicts a number of rechargeable cells in a holder 27 as an illustration of a means by which a plurality of cells according to the invention may be used and/or charged simultaneously. The holder 27 will of course have a size and shape designed for the particular electrical device with which it is associated. A pair of end walls 28 and 29 carry contacts 19'' and 20'' for engaging the terminal 14 of the cell 10a and terminal 15 of cell 10c respectively; that is, the cells 10a, 10b and 10c are arranged in series in this example. The contact 20'' has a resilient member 30 urging the cells into contact with each other and with the contact 19''. A pair of side walls 31 and 32 of the holder 27 restrain lateral movement of the cells placed therein. A charging contact 22'' having a resilient member 33 provides an electrical connection to the charging terminal 16' of cell 10a only. The cells 10b and 10c will, however, be charged along with cell 10a when a charging circuit is completed between the terminals 22'' and 20''. In this way, a plurality of cells may be used or charged while retaining the advantages of the present invention.

It will now be appreciated that the foregoing description discloses an extremely simple and inexpensive means whereby rechargeable and nonrechargeable electrical cells may be interchanged in a given electrical device, and whereby a charging circuit will be automatically disabled when a nonrechargeable cell is in use. Additionally, the provision of an asymmetrical or off-center charging terminal also disables the charging circuit for incorrect polarity of the rechargeable cell, thus preventing any damage thereto from excessive charging current. A further advantage resides in the fact that the provision of a separate charging terminal makes a rechargeable cell easily identifiable and easily distinguishable from a nonrechargeable cell. Therefore, having described several embodiments of my invention by way of illustration rather than limitation, and desiring also to secure by Letters Patent the novel means and instrumentalities thereof, whether or not these may be employed in the same fields or for the same principal objects, I claim:

1. In combination, a rechargeable, substantially cylindrical electrical cell having a pair of end terminals, an insulating wrapper and a charging terminal located on a cylindrical surface of said cell and electrically connected to one of said end terminals; an electrical load circuit connected between said end terminals; and a charging circuit connected between said charging terminal and one of said end terminals, whereby said charging circuit is operative to charge said cell only when a cell having said charging terminal is connected thereto.

2. A combination according to claim 1 wherein said charging terminal is located asymmetrically on said cylindrical surface, whereby said charging circuit is operative to charge said cell only when said cell is connected thereto with proper polarity.

3. A combination according to claim 1 wherein said load circuit includes a lead connected directly to said charging circuit, said lead being connected to one of said end terminals through a diode polarized to permit current flow from said cell through said load circuit but to prevent current flow from said charging circuit through said diode.

4. In combination, a rechargeable, substantially cylindrical electrical cell having a pair of end terminals, an insulating wrapper and a charging terminal located on a cylindrical surface of said cell and electrically connected to one end of said end terminals; a holder for at least one of said cells; a charging contact affixed to said holder for engaging said charging terminal; an end contact affixed to said holder for engaging one of said end terminals; and, a second end contact affixed to said holder for engaging a second one of said end terminals.

5. In a rechargeable, substantially cylindrical electrical cell having a pair of end terminals and an insulating wrapper, a separate charging terminal positioned on a cylindrical surface of said cell and electrically connected to one of said end terminals, wherein said charging terminal is shaped to form a substantially rectangular band on said cylindrical surface.

6. In a rechargeable, substantially cylindrical electrical cell having a pair of end terminals and an insulating wrapper, a separate charging terminal positioned on a cylindrical surface of said cell and electrically connected to one of said end terminals, wherein said cell has a conductive casing underlying said wrapper and connected to one of said terminals and wherein said charging terminal comprises an exposed area of said casing.

7. In a rechargeable, substantially cylindrical electrical cell having a pair of end terminals and an insulating wrapper, a separate charging terminal positioned on a cylindrical surface of said cell and electrically connected to one of said end terminals, wherein said charging terminal is positioned asymmetrically on said cylindrical surface and wherein said area is exposed by removing a portion of said wrapper.

References Cited

UNITED STATES PATENTS

| | | | |
|---|---|---|---|
| 2,982,849 | 5/1961 | Volkerling et al. | 320—2 X |
| 3,220,888 | 11/1965 | Moore et al. | 136—173 |
| 3,275,919 | 9/1966 | Decker et al. | 320—2 |

LEE T. HIX, Primary Examiner

S. WEINBERG, Assistant Examiner

U.S. Cl. X.R.

136—109, 173; 320—25